US008912250B2

(12) United States Patent
Babenkov et al.

(10) Patent No.: US 8,912,250 B2
(45) Date of Patent: Dec. 16, 2014

(54) SYNTHETIC FIBER FOR THREE-DIMENSIONAL REINFORCEMENT OF A CEMENT PRODUCT

(75) Inventors: Evgeny Pavlovich Babenkov, Chelyabinsk (RU); Alexey Aleksandrovich Saveliev, Chelyabinsk (RU)

(73) Assignee: Obschestvo S Ogranichennoi Otvetstvennostiu C Airlaid, Chelyabinsk (RU)

( * ) Notice: Subject to any disclaimer, the term of this patent is extended or adjusted under 35 U.S.C. 154(b) by 751 days.

(21) Appl. No.: 12/747,004

(22) PCT Filed: Dec. 10, 2008

(86) PCT No.: PCT/RU2008/000757
§ 371 (c)(1),
(2), (4) Date: Jun. 9, 2010

(87) PCT Pub. No.: WO2009/075609
PCT Pub. Date: Jun. 18, 2009

(65) Prior Publication Data
US 2010/0267864 A1    Oct. 21, 2010

(30) Foreign Application Priority Data
Dec. 10, 2007   (RU) ............................... 2007145389

(51) Int. Cl.
| C08L 83/00 | (2006.01) |
| D01F 1/10 | (2006.01) |
| C04B 20/00 | (2006.01) |
| D06M 10/02 | (2006.01) |
| D06M 15/227 | (2006.01) |
| D06M 15/53 | (2006.01) |
| D01F 8/04 | (2006.01) |
| D06M 15/263 | (2006.01) |

(52) U.S. Cl.
CPC .. *D01F 8/04* (2013.01); *D01F 1/10* (2013.01); *C04B 20/0068* (2013.01); *D06M 10/025* (2013.01); *D06M 15/227* (2013.01); *D06M 15/53* (2013.01); *D06M 15/263* (2013.01)
USPC ........ 523/201; 264/23; 264/171; 264/172.15; 264/333

(58) Field of Classification Search
USPC ................. 264/333, 171, 23, 172.15; 523/201
See application file for complete search history.

(56) References Cited

U.S. PATENT DOCUMENTS

| 5,705,119 A | * | 1/1998 | Takeuchi et al. ............... 264/464 |
| 6,723,162 B1 | | 4/2004 | Cheyrezy et al. |
| 6,780,367 B2 | * | 8/2004 | Pyzik et al. .................... 264/333 |
| 2003/0150364 A1 | | 8/2003 | Orange et al. |
| 2006/0276088 A1 | * | 12/2006 | DeWeese ......................... 442/59 |
| 2007/0192965 A1 | * | 8/2007 | Komeda et al. ............... 8/115.51 |

FOREIGN PATENT DOCUMENTS

| EP | 0 340 763 A1 | 11/1989 |
| JP | 2199046 A | 8/1990 |
| RU | 2074153 C1 | 2/1997 |
| RU | 2079585 C1 | 5/1997 |
| RU | 2274618 C2 | 2/2004 |
| RU | 2245858 C2 | 2/2005 |
| WO | 90/06902 A1 | 6/1990 |
| WO | 02/00566 A1 | 1/2002 |
| WO | 2004/033770 A1 | 4/2004 |

OTHER PUBLICATIONS

PCT Search Report for U.S. Appl. No. PCT/RU2008/000757 dated May 4, 2009.
"Concrete Admixtures Handbook Properties, Science, and Technology" by V.S. Ramachandran. Head, Building Materials Section Division of Building Research National Research Council Canada Ottowa, Ontario, Canada. Moscow 1988 pp. 183-185.

* cited by examiner

*Primary Examiner* — Hannah Pak
(74) *Attorney, Agent, or Firm* — McCormick, Paulding & Huber LLP

(57) ABSTRACT

The present invention provides a bicomponent fiber for three-dimensional reinforcement of a cement product characterized in that it represents a coaxial core-coat fiber wherein the core comprises a thermoplastic polymer and the coat either comprises thermoplastic polymer resistant to environment having pH>11 and one or more hydrophilic and/or surface active substance(s) in an amount of 3 to 30% of the total weight of the coat, or the coat comprises thermoplastic polymer resistant to environment having pH>11 grafted with active or unsaturated monomers of one or different kinds constituting 3 to 25% of total weight of the coat, wherein the surface tension of the coat is at least 45 mN/m. The invention also provides a method for production of said fiber, a cement product comprising such fiber and a method of production of said cement product.

31 Claims, No Drawings

SYNTHETIC FIBER FOR THREE-DIMENSIONAL REINFORCEMENT OF A CEMENT PRODUCT

CROSS REFERENCE TO RELATED APPLICATIONS

This application is entitled to the benefit of and incorporates by reference essential subject matter disclosed in International Patent Application No. PCT/RU2008/000757 filed on Dec. 10, 2008 and Russian Patent Application Serial No. 2007145389 filed Dec. 10, 2007.

FIELD OF THE INVENTION

The present invention relates to synthetic fibers suitable for three-dimensional reinforcement of cement products.

BACKGROUND ART

It is generally known that cement products have a number of technical and economical advantages as compared with other constructional materials. However, in many cases the use of cement products is limited due to their insufficient durability and insufficient longevity that are caused by formation of unstructured shrinkage cracks.

Formation of unstructured shrinkage cracks is caused by that small cracks (so called hair cracks) are formed during the production of cement products from cement mortar. Further, when one-time or constant load is applied to an article made of a cement product or by the action of the weight of the article itself the hair cracks begin to propagate, their amount and their size enlarge and they transform into larger shrinkage cracks causing detriment in durability and destruction of the article made from cement product. By preventing the propagation of hair cracks one can achieve an increase in effective durability of a concrete product and promote an increase of its longevity.

In order to additionally increase physical and mechanical durability of cement products different reinforcing components, such as metal reinforcement, mineral elements and synthetic fibers are used. Therewith the synthetic fibers are known to be most effective to prevent the development of unstructured shrinkage cracks from hair cracks as they are the thinnest ones of the above listed types of reinforcement elements and their size is comparable to that of hair cracks.

Thus the three-dimensional reinforcement of a cement product with synthetic fibers is able to compensate the main drawbacks of concrete products such as shrinkage cracking formation, poor tensile strength and high brittleness at destruction. Therefore a cement product comprising a fiber component shows higher collapsing strength, tensile strength, shear strength, impact resistance, fatigue strength, crack strength, cold endurance and watertightness as compared to a cement product which does not comprise reinforcing synthetic fiber.

However, not all synthetic fibers are equally suitable to be used in cement products. First of all, such parameters as durability, deformability, chemical resistance of the reinforcing material and its adhesion to water-cement suspension shall be taken into account. Preferably, the properties of a synthetic fiber used for three-dimensional reinforcement are such that the use of these fibers could allow avoiding, partially or completely, the use of metallic reinforcing elements in the cement product since the use of metallic reinforcement leads to the increase of the weight of a cement product as well as the production costs. Particularly, in order to ensure effective prevention of hair crack formation by use of a synthetic fiber as a component of a cement product, important is that these fibers would be uniformly dispersed within the whole volume of cement mortar since only in such case hair crack formation can be prevented within the whole volume of a cement product.

Patent RU 2274618 discloses a cement product (concrete) reinforced with metallic and synthetic fibers and comprising pozzolana components and a filler having particle size not higher than 10 mm. Synthetic fibers constitute 0.1 to 3 vol. % of the concrete after the setting. Preferably, the synthetic fibers have thickness of less than 80 µm, length between 1.5 mm and 12 mm and preferably consist from polyethylene and polypropylene.

Patent RU 2245858 discloses a cement product (concrete) comprising organic fibers which may consist from polyethylene including high density polyethylene, polypropylene and other synthetic polymers. In order to strengthen the adhesion of organic fibers a substance selected from silica, precipitated sodium carbonate, phosphate, latex polyvinyl alcohol and antifoaming agent is additionally introduced into the cement mortar intended for the production of said concrete. Said concrete additionally further comprises reinforcing fillers which represent metallic fibers or fibers made from other inorganic materials.

The use of polyolefin synthetic fibers as disclosed in the above mentioned patents does not allow avoiding completely the use of metallic reinforcement and inorganic fibers in a cement product. Because of that the production of cement products as disclosed in RU 2274618 and RU 2245858 is expensive and the mass of the product obtained increases due to the inclusion of metallic reinforcing component. One of the reasons leading to the necessity of use of metallic reinforcement in the products disclosed in said patents is the fact that the fibers are not dispersed uniformly within the volume of a cement product and may not thus work effectively. It is due to the fact that surface tension of the fibers used according to said patents is lower than surface tension of water and synthetic polyethylene fibers cannot therefore be homogenously dispersed in aqueous medium of cement mortar.

Better results can be achieved if fibers are used which have been surface-treated so that to increase the surface tension of such fiber and to make its surface uniformly hydrophilic. Owing to such treatment the fibers disperse uniformly within the volume of cement mortar.

So, patent RU 2074153, which is the nearest prior art for the present invention, discloses bunches of synthetic fibers for disperse reinforcement of cement based articles. According to said patent, bunches of synthetic fibers comprising 10 to 106000 individual fibers per a bundle are introduced into cement mortar. Before being introduced into cement mortar, the bunches of synthetic fibers are treated with wetting agent in order to increase surface tension of individual fibers. In order to further increase the surface tension, along with treating with wetting agent corona discharge treatment of fibers may also be applied. Individual synthetic fibers according to said patent represent polyolefin fibers, preferably polyethylene or polypropylene fibers.

However, although the synthetic fibers used according to patent RU 2074153 allow avoiding the use of metallic reinforcement, cement products with such fibers do not show high durability. This is due to the fact that surface treatment of fibers with hydrophylizing agents cannot provide for uniform surface tension all over the whole surface of a fiber. Moreover, when the whole bunch of fibers is treated as it is disclosed in RU 2074153 some individual fibers can remain untreated which makes dispersing of such fibers in a cement product even worse.

Therefore, there still remains a necessity to improve further the hydrophilic characteristics of fibers, such as the strength of surface tension and uniformity of strength of surface tension all over the surface of a fiber.

Thus, the object of the present invention is to provide a synthetic fiber for three-dimensional reinforcement of a cement product, which fiber shall have uniformly hydrophilic surface with high strength of surface tension that would allow such fiber to disperse uniformly within the volume of a cement product. The fiber shall therewith possess good durability characteristics such as high tensile strength, high modulus of elongation and low elongation at break.

It was found surprisingly that the object of the present invention may be achieved by providing synthetic fiber which represents coaxial coat-core fiber wherein the core comprises thermoplastic polymer, preferably polyethylene, polypropylene, poly-4-methyl-1-pentene or polyethylene terephthalate and the coat comprises thermoplastic polymer resistant to pH>11 and also comprises hydrophilic and/or surface active substances in an amount of 3 to 30% of the total weight of the coat, or the coat comprises thermoplastic polymer resistant to pH>11 grafted with active or unsaturated monomers in an amount of 3 to 25% of the total weight of the coat, wherein in both cases the surface tension of the coat of not less than 45 mN/m is achieved.

SUMMARY OF THE INVENTION

The present inventors have shown that when the substances imparting the surface of a fiber with hydrophilic properties are added directly to the composition of polymer melt before the extrusion of the fiber or when polymer of the fiber is grafted with comonomers increasing its hydrophilic properties instead or along with treatment of the surface of the fiber with the above mentioned substances higher values of surface tension and more uniform hydrophilic properties within the bunch of fibers and within the surface of an individual fiber may be achieved. However, the present inventors have found that both in case when the substances imparting fiber with hydrophilic properties are included into the composition of the fiber and when grafted comonomers are introduced into the polymer of the fiber, the durability of the resulting fiber decreases to the values which are too low and the fiber cannot prevent shrinkage cracking formation and withstand ruptures caused by shrinkage stress. This is due to the fact that most of the substances imparting the surface of a fiber with hydrophilic properties and most of the hydrophilic comonomers represent considerably large molecules which are comparable in their size with monomers of the polymer mainly constituting the fiber. Therefore they affect dimensional orientation of molecules of the main polymer causing its disordering.

In order to solve this problem the present inventors propose to change the structure of fibers for three-dimensional reinforcement. While all synthetic fibers for three-dimensional reinforcement of cement products known from the prior art are monocomponent fibers, the present inventors propose to use for three-dimensional reinforcement a bicomponent fiber wherein only the coat undergoes the above described modifications providing it with high and uniform hydrophilic properties and decreasing its durability, while the core of the fiber which has not undergone such modifications ensures durability of the whole fiber. Thus the technical result of the present invention, which result lies in providing a fiber showing both high and uniform hydrophilic properties of the surface and at least satisfactory durability, is achieved owing to the special bicomponent structure of the fiber.

Thus the present invention provides a bicomponent fiber for three-dimensional reinforcement of a cement product characterized in that it represents a coaxial core-coat fiber wherein the core comprises a thermoplastic polymer and the coat comprises either a) thermoplastic polymer resistant to environment having pH>11 and one or more hydrophilic and/or surface active substance(s) in an amount of 3 to 30% of total weight of the coat, or b) thermoplastic polymer resistant to environment having pH>11 grafted with active or unsaturated monomers constituting 3 to 25% of total weight of the coat, wherein the surface tension of the coat is at least 45 mN/m.

Further, the present invention provides a method of production of said synthetic fiber comprising extrusion of melt of the main coat component and the main core component though a coaxial spinneret to form a bicomponent composition wherein both the main coat component and the main core component represent thermoplastic polymers, the main coat component is resistant to environment having pH>11, and one or more hydrophilic and/or surface active substance(s) in an amount of 3 to 30% of total weight of the coat is introduced into the coat component melt during the extrusion.

The present invention also provides a method of production of said synthetic fiber comprising extrusion of melt of the main coat component and the main core component though a coaxial spinneret to form a bicomponent composition wherein both the main coat component and the main core component represent thermoplastic polymers, the main coat component is resistant to environment having pH>11 and as the main coat component a thermoplastic polymer is used grafted with active and/or unsaturated monomers constituting 3 to 25% of total weight of the coat.

The invention also provides a cement product prepared from cement such as concrete mix, mortar mix, and cement paste comprising dispersion of synthetic fibers characterized in that the fibers according to the present invention are used as the synthetic fibers.

Further, the present invention provides a method of production of said cement product comprising preparing aqueous concrete mix or aqueous cement mortar adding synthetic fibers, stirring said mix or mortar and casting it to obtain an article of predefined configuration characterized in that the fibers according to the present invention are used as the synthetic fibers.

DETAILED DESCRIPTION OF THE INVENTION

The present invention provides a bicomponent fiber for three-dimensional reinforcement of a cement product characterized in that it represents a coaxial core-coat fiber wherein the core comprises a thermoplastic polymer and the coat comprises thermoplastic polymer resistant to environment having pH>11 (which is the pH value characteristic for cement mortar environment) and one or more hydrophilic and/or surface active substance(s) in an amount of 3 to 30%% of the total weight of the coat. As an alternative, the coat may comprise thermoplastic polymer resistant to environment having pH>11 grafted with active or unsaturated monomers constituting 3 to 25% of total weight of the coat. Therewith, both the introduction of hydrophilic and/or surface active substances into the coat and the grafting of the coat polymer with active or unsaturated comonomners ensure surface tension of the coat is at least 45 mN/m.

Owing to high tenacity of the core thermoplastic polymer the fiber of the invention shows advantageous durability characteristics. Therewith, owing to the surface tension of the coat of at least 45 mN/m achieved by the above described modifications of the surface, said fibers is uniformly dispersed in the whole volume of a cement product. The possibility to produce a fiber combining said properties is achieved owing to the fact that the hydrophilic and/or surface active substances are added to the coat and do not penetrate the core. Therefore the detrimental effect of these substances with regards to the durability of the polymer is prevented in the core and the core appears to be firm enough to ensure high durability of the whole fiber.

Hydrophilic and/or surface active substances which are included into the coat of the fiber represent preferably hydrophilic polymers or copolymers. Therewith these hydrophilic polymers or copolymers are most preferably selected from the group consisting of polyglycol ester, polyethoxylated amide, ethylene vinylacetate with vinylacetate content of at least 30 wt. %, ethylene-acrylic acid copolymer, polyethylene-glycol lauryl ether, alkyl-phosphate-amine ester, ethylene-diamine polyethyleneglycol.

Advantageously, said hydrophilic and/or surface active substances may also represent fatty acid esters and amides. Therewith the fatty acid esters and amides are most preferably selected from stearic acid glycerol ester and stearic acid amide.

Advantageously, said hydrophilic and/or surface active substances may also represent non-ionic surface active substances or cationic surface active substances.

One of the most preferable examples of a hydrophilic substance suitable to be included into the coat of the fiber according to the invention is ethylene-vinylacetate (Sevilen) which represents the product of copolymerysation of ethylene and vinylacetate.

Properties of ethylene-vinylacetate mainly depend on vinylactetate content. When vinylacetate content increases, durability, heat stability and crystallinity (breaking stress at elongation) of vinylacetate decrease while hydrophilic properties and adhesiveness increase. Ethylene-vinylacetate with ethylene content of more than 30 wt. % which shows excellent hydrophilic properties is used within the coat of the fiber of the invention. Therewith ethylene-vinylacetate with vinylactetate content of not more than 15 wt. % has poor hydrophilic properties but shows very high durability which allows using it as an additive increasing the durability of the core as will be disclosed hereinafter.

As it has been already noted, according to second alternative of the fiber of the invention the coat comprises and preferably totally consists of a thermoplastic polymer resistant to environment having pH>11 grafted with active or unsaturated monomers constituting 3 to 25% of a total weight of the coat. Such structure of the fiber according to the invention also enables the fiber to show both advantageously high durability characteristics and necessary hydrophilic properties. Active or unsaturated grafted comonomers provide the coating polymer with surface tension of at least 45 mN/m. Therewith, although these grafted monomers as well as surface active substances mentioned above negatively influence the durability of coat polymer, the durability of the whole fiber according to the invention remains high enough as it has a core which does not contain said grafted monomers.

According to said second alternative of the fiber of the invention, the coat polymer is preferably grafted with active or unsaturated monomers selected from the group consisting of isobutylene, alpha-methylstyrene, vinylalkyl ethers, isoprene, butylacrylate, methylacrylate, methylmethacrylate, butylacrylate, butylmethacrylate, butadiene and styrene, most preferably—butylacrylate and methylmethacrylate.

Preferably, the core thermoplastic polymer is selected from the group comprising isotactic polypropylene, polyethylene, poly-4-methyl-1-pentene and polyethylene terephthalate. Durability of these polymers even without any additive mentioned herein is high enough to ensure that fibers having the core made of said materials could appropriately resist the action of shrinkage stress. Therewith the use of such polymers ensure low production cost of the synthetic fiber owing to that the energy consumption of its production process is reduced since these polymers have relatively low melting point and are easily extrudable.

Preferably, the coat thermoplastic polymer is selected from the group comprising isotactic polypropylene, polyethylene and poly-4-methyl-1-pentene. Along with the above mentioned advantages these polymers are resistant to cement mortar environment having pH>11 and therefore they may be used as coat components.

Preferably core of the fiber according to the invention comprises, besides the thermoplastic polymer, substances which initiate formation of fibrillar crystals in an amount of 0.5 to 3 wt. % of total core weight and/or high-molecular polymers and/or copolymers in an amount of 3 to 30 wt. % of total core weight. This imparts the core with the following characteristics: tensile strength of the core is at least 800 MPa, modulus of elongation of the core is at least 8000 MPa and elongation at break of the core is not higher than 20%.

Preferably, the above mentioned substances which initiate formation of fibrillar crystals represent finely dispersed minerals such as oxides, nitrides, carbides or silicates and have mean particle size which is 10 to 50 times smaller than cross-sectional area of the fiber (20 to 50 µM).

The high-molecular polymers mentioned above are preferably selected from polyvinyl alcohol and ethylene vinylacetate having vinylacetate content of less than 15 wt.%.

Preferably, the diameter of the synthetic fiber is 10 to 50 µm, most preferably 18 to 25 µm. Such diameter is comparable to the size of shrinkage cracks usually occurring in a cement product and this ensures better functioning of the synthetic fiber in as reinforcing component of a cement product.

Length of the synthetic fiber depends on the nature of the cement product wherein the fiber shall be used; primarily it depends on particle size of the filler of cement mortar. Length of the fiber preferably does not exceed 25 mm since longer fibers may cause formation of fiber balls in cement mortar. It is also preferable that the length of the fiber would be not less than 3 mm since shorter fibers shall not effectively anchor between the particles of cement mortar.

The core preferably constitutes 10 to 50% by weight of synthetic fiber, more preferably is constitutes 10 to 15% by weight of the fiber. If the core constitutes less than 10% by weight of the fiber there is a risk that the when the bicomponent fiber is spun through a spinneret it will not be fully covered by the coat. The use of the coat in an amount of more than 50 wt. % can, in turn, lead to considerable deterioration of the required mechanical characteristics (modulus of elongation, tensile strength and elongation at break).

The cross-sectional shape of the fiber is preferably round since such shape allows producing the fiber with use of equipment which is generally used in production of fibers intended for manufacture of thermally bonded nonwoven fabric.

Further aspect of the invention relates to a method for producing above disclosed core-coat synthetic fiber for three-dimensional reinforcement of a cement product characterized in that both the main coat component and the main core component represent thermoplastic polymers, the main coat component is resistant to environment having pH>11 and one or more hydrophilic and/or surface active substance(s) in an amount of 3 to 30% of total weight of the coat is introduced into melt of the coat component during the extrusion. Since the hydrophilic and/or surface active substances are added into the melt of the core component prior to extrusion they do not penetrate the core of the fiber where they would hinder the achievement of structural regularity of thermoplastic polymer molecules necessary to achieve required durability of the core.

Further a method of producing a core-coat synthetic fiber for three-dimensional reinforcement of a cement product is provided comprising extrusion of melt of the main coat component and the main core component though a coaxial spinneret to form a bicomponent composition wherein both the main coat component and the main core component represent thermoplastic polymers, the main coat component is resistant to environment having pH>11 and as the main core component a thermoplastic polymer is used grafted with active and/or unsaturated monomers constituting 3 to 25% of total weight of the coat. Since the method according to the invention substantially avoids interpenetration of the two main components of the fiber—the coat component comprising a polymer modified with active and/or unsaturated monomers and having surface tension of at least 45 nM/m but poor durability characteristics and the highly durable core component, this second alternative of the invention also makes it possible to produce a fiber simultaneously having high durability and the hydrophilic characteristics disclosed above.

The terms "main core component" and "main coat component" for the purposes of the present invention mean thermoplastic polymers including, in case of the coat component, polymers grafted with active and/or unsaturated monomers, which polymers constitute the highest weight fraction of the core and the coat respectively, define the structure of the bicomponent fiber and, in case of the main core component, also define mechanical properties of the fiber. Thermoplastic polymers which may constitute the main core component and the main coat component were characterized in detail within the foregoing disclosure of the fiber of the invention. A person skilled in the art would be aware of that along with said polymers and hydrophilic or surface active substances both the core and the coat of the fibers according to the invention may comprise any other additives known in the field and having different functions. Correspondingly both variants of the method according to the invention also may comprise the addition of such known additives to the core or coat melt.

According to either variant of the method of the invention the substances initiating fibrillar crystal formation in an amount of 0.5 to 3% of the total weight of the core and/or high-molecular polymers and/or copolymers in an amount of 3 to 30% of the total weight of the core are preferably added to melt of the core polymer during the extrusion.

According to either variant of the method of the invention the resulting fibers are preferably stretched with stretch ratio of 2.5 to 4.5. This provides further improvement in durability of the fiber since such stretching promotes further spatial ordering of the polymers of the fiber (structural modification of the fiber).

Either variant of the method of the invention preferably comprises the following steps:
1.) Melt spinning of the coat component and the core component to form a bicomponent composition.
2.) Stretching the obtained primary tow.
3.) Surface treatment, thermal stabilization, drying and cutting.

The fibers are manufactured at two lines, which are the fiber forming line and the cutting line.

Said steps are described hereinafter in more detail.

1.) The coat component and the core component are melted in separate extruders while being stirred in the way to provide homogenous consistency of both melts. Temperature of the molten components in the extruders must be higher that the melt points of these components and must ensure particular viscosity characteristics advantageous for subsequent spinning of the fibers. Therewith the above described components increasing core durability are added into the core melt and the above described hydrophylity increasing components are added to the coat melt if the first variant of the method is carried out. When the second variant of the method is carried out, a polymer grafted with the above described active or hydrophilic monomers is used as the main coat component.

Molten core and coat components are fed to a spinneret block though dispersing system and filtering system and they further run though spinnerets. 4 to 10 spinnerets may be used. The obtainment of bicomponent polymer fibers is more complex procedure than the obtainment of monocomponent fibers since two components of such fibers shall be appropriately distributed at the spinnerets. Therefore when bicomponent fibers are obtained a spinnerets of special type are used which form the melt flows into predefined concentric shape. The diameter of openings in the filter depends on the diameter of the bicomponent fibers that are produced. The amount of shaping openings is about 1800. The fibers formed which are concentric at their cross-section go to a cooling well where they are cooled by air flow. When fibers leave the well they are collected into a tow and prestretched. The prestrech (with stretch ratio of about 1.1 to 1.8) is intended to prevent crispness of fibers and to ensure their better packaging to cans (the package for transporting the tow to stretch line). The fibers may also be winded at spools or bobbins.

2.) The tow of fibers is subsequently stretched with use of so-called non-linear stretching method which is performed independently of the spinning process. Stretching is performed with use of equipment comprising a row of hot rolls and baths of hot solution (or steamers) wherein the whole tow of fibers is simultaneously stretched. The tow of fibers passes though the first row of rolls, then it passes though the bath of hot solution (steamer) and then though the second roll. Rotation speed of the second row of rolls is higher than that of the first one. The heated tow of fibers is thus stretched with the stretch ratio determined by the ratio of first row speed to second row speed. Additionally, second bath of hot solution (steamer) and third row of rolls may be used (two step stretching), wherein the third row has higher rotation speed than the second one. In such case the stretch ratio represents the ratio between rotation speed of the last and the first row of rolls.

The specific stretch ratio contributes to the obtainment of a fiber with predefined tensile strength.

Synthetic fibers according to the invention are stretched with the stretch ratio of about 2 to 12. In order to obtain the required values of tensile the stretch ratio is preferably between 2.5 and 4.5.

3.) Preferably, the surface of the synthetic fibers according to the invention is additionally treated with corona discharge and/or hydrophilic and/or surface active substance selected from the group consisting of fatty acids-glycidol esters, fatty acid amides, polyglycol esters, polyethoxylated amides, non-ionic surface active substances and cationic surface active substances, or with mixture of two or more said substances. Due to such treatment the surface of the fibers may acquire even better hydrophilic properties.

The fibers are then thermally fixed and dried in a conveyor type furnace and after that the dried tow is fed into the cutting machine "Neumag" wherein the fibers are cut into pieces of desired length (3 to 25 mm).

The obtained tows of fibers are packed into water-soluble bags or polyethylene or polypropylene bags requiring unpacking. Weight of a fiber package is 0.6 to 0.9 kg.

One further aspect of the present invention relates to a cement product obtained from concrete mix, mortar mix or cement paste comprising dispersion of synthetic fibers according to the invention.

The cement product according to the invention represents a three-dimensionally reinforced cement product having advantageous physical and mechanical properties obtained by mixing, forming and solidifying of a mix based on hydraulic cement. The mix consists of hydraulic cement, water, fillers, functional additives and three-dimensional reinforcing fibers homogenously dispersed within the volume of the concrete mix. The three-dimensional reinforcing fiber used in the cement product according to the invention represents the fiber according to the invention.

There are many varieties of cement products which are subdivided, according to their purpose, into structural and special cement products.

According to their thickness, cement products are subdivided into extra-heavy concretes (more than 2500 kg/cm3), heavy concretes (1200-2200 kg/cm3), light concreters (600-1200 kg/cm3) and extra light concretes (500 kg/cm3 and less). With regards to durability the cement products are subdivided into following grades: heavy concrete—100, 150, 200, 250, 300, 400, 500, 600, 700, 800 and light concrete—25, 35, 50, 75, 100, 150, 200, 300, 400.

According to the type of cement, the type of fillers and the area of application, cement products are subdivided into: shotcrete, dry mix, hydraulic concrete, heavy concrete, lightened concrete, light concrete, artificial stone, pavement concrete, floated concrete, fibred concrete etc.

Area of application of the fiber according to the invention is not restricted to any particular type of cement products.

Preferably, said cement product comprises the fibers according to the invention in an amount of 0.01 to 0.05 wt. %. It is difficult to add fibers to concrete mix in an amount of more than 0.05 wt. % without the formation of balls of fibers, while in an amount of less than 0.01 wt. % the fibers shall not have reinforcing effect.

One further aspect of the present invention relates to a method of production of said cement product comprising preparing aqueous concrete mix or aqueous cement mortar adding synthetic fibers, stirring said mix or mortar and casting it to obtain an article of predefined configuration. The method of production of a cement product according to the invention differs from the known methods in that the fibers which are added to the mortar represent fibers according to the invention. Preferably, the fibers according to the invention are added as the tows of fibers.

Additionally, organic surface plasticizing agents which change the kinetics and improve rheological properties of the obtained cement products may be added to cement mortar. Preferable hydrophilic plasticizing agents include commercially available additives of the following commercial names: S-3, SP-1, S-5, S-62, LST, Mighty 100, Sikamet, Isoplastic, Cementol Delta, Cementol Omega F, Addiment BV1, Melment, Lignopan B-1, Lignopan B-3, Universal P-2. Preferable hydrophobic plasticizing agents include commercially available additives of the following commercial names: Penta-801, Penta-803, Penta-804, Penta-805, Penta-814, Penta-820, Penta-830, GCJ, PFM MLK, GCJ-94M, hydrophobizing liquid 136-157 M, GCJ-10, GCJ-11.

Owing to the hydrophilic properties achieved by the surface of the fibers according to the invention as a result of introduction of hydrophilic and/or surface active substances into the coat or modifying the coat polymer by grafting it with active and/or unsaturated monomers, when the concrete mix or cement mortar is stirred the tows of fibers completely disintegrate to individual fibers which uniformly disperse within the volume of the concrete mix or cement mortar and are tightly hooked in the cement after the solidification is completed.

Preferably, the tows of fibers comprise individual fibers of particular cutting length. The cutting length mainly depends on the fraction and the type of the filler used and is conditioned by the size of the cell of concrete matrix. When the filler of sand type is used (0.14 to 5 mm) for cement-sand concrete or sand concrete the preferable cutting length is 3 to 8 mm. For concretes, depending on the filler fraction, preferable cutting length is 8 to 25 mm. Use of fibers longer than 25 mm is undesirable since in such case balls of fibers may form.

The fibers according to the invention may be added to the ready concrete mix or cement mortar. Therewith best dispersion may be achieved in gravity mixer or forced mixer.

The tows of the fibers according to the invention may also be mixed with dry components of concrete mix in the process of production of a concrete mix or in the process of production of cement-sand dry mixes (cement-sand montage mix, self-leveling floor, plaster and other mixes).

If the concrete is prepared at a plant specializing in manufacturing precast structures and articles, dry components of the mixture are mixed in technological order envisaged by the technique of preparing the concrete and necessary amount of the fibers is added with use of a batcher or by another method. Therewith the time of stirring of the concrete mix shall be 10 to 20 longer than the time required by Russian Federation State Standard No. 7474-94 in order to make the dispersion of the fibers as homogenous as possible.

Fibers may be added to a cement mortar in a mixer mounted on a car which delivers ready concrete mix directly to the place where the cement mix is to be deposited.

The amount of the fiber according to the invention which would provide for the improvement of physical and mechanical parameters of the cement product constitutes 0.01 to 0.05% by weight of the cement material. It is hard to introduce the fibers in an amount of more than 0.05 wt. % into concrete mix without the formation of balls of fibers. The amount of the fibers of 0.01 to 0.05 by weight of the cement material leads to the increase in durability of cement product both in liquid plastic state and in solidified state. The addition of fiber according to the invention has the following immediately emerging effects: it leads to the increase of bonding of the concrete mix, prevents precipitation of big and heavy particles at condensation, ensures the plasticity of the mix in liquid state and makes pump feeding of the concrete mix easier. The increase of the plasticity in liquid plastic state prevents fissure formation and segregation of components of cement products when they are shaped from concrete mix or cement mortar.

As a result of the addition of the fibers according to the invention to a cement products the cone slump and water pollution class of the cement product slightly decrease but placeability of the mix improves. Therefore after the addition of the fibers according to the invention to a concrete mix or a cement mortar it is not necessary to add water to improve cone slump.

In order to further decrease water demand of the fibers and improve the placeability and also in order to control the rheological properties and/or reaction rate of hydraulic cement with mixing water, different organic surface active plasticizing agents known to a person skilled in the art may be added to cement mortar or concrete mix for producing the cement product according to the invention.

Hydrophilic plasticizing agents include without limitation commercially available additives of the following commercial names: Hydro C-3, SP-1, S-5, S-62, LST, Mighty-100, Sikamet, Isoplastic, Cementol Delta, Cementol Omega F, Addiment BV1, Melment, Lingopan B-1, Lingopan B-3, Universal P-2.

Hydrophobic plasticizing agents include without limitation commercially available additives of the following commercial names: Penta-801, Penta-803, Penta-804, Penta-805, Penta-814, Penta-820, Penta-830, GCJ, PFM MLK, GCJ-94M, hydrophobizing liquid 136-157 M, GCJ-10, GCJ-11.

The invention is further illustrated by the following examples which do not limit its scope defined only by the claims.

Example 1

Preparation of Long Cut Synthetic Fibers

The fibers were prepared by melting polypropylene 21020-02, grade 1, Russian Federation State Standard No. 26996-86 in two separate extruders. Ethylene vilnylacetate was added to the polypropylene melt in one extruder in an amount of 20 wt. % of the melt. This melt was used to form the coat of the fiber. To another melt, which was used to form the core, polyvinyl alcohol as cohesion binder was added with use of a batcher in an amount of 7 wt. % of the melt.

Melts from the extruders were further fed through pipelines to a spinneret block wherein fibers with concentric core-coat structure were formed. The fibers were then cooled with air flow. After that the fibers were treated with corona discharge and stretched with stretch rate of 1.2. The formed tows of fibers were packaged into "cans" (package for transporting to stretch line) after that the fibers were stretched with stretch ratio of 3.5, treated with solution of Sintesin 7465 and thermally fixed. Further the fibers were cut at cutting machine Neumag with cut length of 12 mm. The diameter of the fibers thus prepared was 25 μm, tensile strength determined by the method of measuring a superficial wetting angle and polymer testing method DIN 53374 was 35 mN/m. Tensile strength was 584 MPa, elongation at break—38% (evaluations were carried out at tensile testing machine P-50 2167).

Example 2

Preparation of Short Cut Synthetic Fibers

Short cut synthetic fibers were obtained by the method analogous to that described in Example 1 except that the fibers were cut with 5 mm length. The diameter of a fiber thus prepared is 25 μm, surface tension—48 nM/m, elongation at break—27%.

Example 3

Concrete for Precast Units of Residential and Industrial Buildings

In building sector most widely used is conventional heavy concrete of density of 2200-2500 kg/m3 comprising fillers (sand, gravel, crushed rock) of heavy rocks and also the side products of local industry (such as, e.g., crushed slags and granulated metallurgical slags). In order to promote solidification of concrete the heat treatment is performed when preparing precast concrete units.

Test and reference samples of conventional heavy concrete mix of the following composition were prepared.

| | |
|---|---|
| Water: | 140 l, |
| Cement: | 350 kg, |
| Crushed rock: | 1415 kg, |
| Sand: | 590 kg. |

Tows of fibers according to Example 1 in an amount of 0.875 kg per 350 kg of cement material (that is 0.0025 kg per 1 kg of cement) were added to test mix sample.

Tows of fibers disclosed in the patent RU 2074153 having length of 12 mm and diameter of 20 μm were added to reference mix sample in an amount of 1.2 per 1 m3 of the mix as disclosed in RU 2074153.

28 days later (grade age of concrete) collapsing strength and impact toughness of the reference sample and the test sample were measured. Collapsing strength of the test sample was 12.3% higher than that of the reference sample and impact toughness was 2.1 times higher than that of the reference sample.

| Age of concrete (days) | Composition | Density, kg/m3 | CS, MPa | Effectiveness of using the fiber, % |
|---|---|---|---|---|
| 7 | reference | 2403 | 25.07 | 27.8 |
|  | with fibers of the invention | 2412 | 32.23 |  |
| 28 | reference | 2413 | 47.28 | 12.7 |
|  | with fibers of the invention | 2436 | 53.57 |  |

Cleavage strength (CS) of reference concrete sample and concrete sample comprising the fibers according to the invention after 28 days of normal solidifying is given.

| Composition | Density, kg/m3 | CS, MPa | Effectiveness of using the fiber, % |
|---|---|---|---|
| reference | 2403 | 2.75 | 26.5 |
| with fibers of the invention | 2416 | 3.48 |  |

Increase in durability characteristics is caused by improvement of adhesive properties of the fiber and by increase of its tensile strength.

Example 4

Concrete and Dry Mixes for Self-Leveling Floor

Main calculated parameters of industrial concrete floors are the flexible stress and compression stress, watertightness, and resistance to impact stress and dynamic load.

Test and reference samples of self-leveling floor mix having the following composition were prepared:

| | |
|---|---|
| Water: | 140 l, |
| Cement: | 510 kg, |
| Crushed rock: | 1250 kg, |
| Sand: | 700 kg. |

Tows of individual fibers according to Example 1 were added to test mix sample in an amount of 1.1 kg per 510 kg of cement material (that is 0.0023 kg per 1 kg of cement).

Tows of polypropylene fibers disclosed in the patent RU 2074153 having length of 12 mm and diameter of 21 μm were added to reference mix sample in an amount of 1.2 per 1 m3 of the mix.

Comparison of concrete samples prepared from test and reference mixes of the above disclosed composition show the change of the following characteristics of the test sample as compared with the reference sample:

The amount of shrinkage cracks in the test sample measured according to State Standard of the Russian federation No. 22690-88 was 28% lower than that of the reference sample.

Tensile strength in bending of the test sample was 9.4% higher than that of the reference sample.

Impact resistance of the test sample was 6 times higher than that of the reference sample (comparative in-place tests)

Crack toughness of the test sample was 5 to 7 times higher than that of the reference sample.

Example 5

Cellular (Foamed) Concretes of the Density Grade D600 Solidified without Autoclave Cellular concrete is the constructional and heat insulating material for walling constructions.

Test and reference mix samples were prepared having the following composition.

| | |
|---|---|
| Cement: | 450 kg |
| Sand of size modulus 1-1.5 | 500 kg |
| Foaming agent | 0.7 kg |
| Water | 25 kg |

Measurements were carried out according to the Russian Federation State Standard No. 21520-89

| | Reference | Test with the fiber according to the invention | Effectiveness |
|---|---|---|---|
| Collapsing strength, MPa | 1.43 | 1.6 | 12.5% |
| Tensile strength, MPa | 0.251 | 0.304 | 21.1% |
| Shrinkage, mm/m | 0.42 | 0.24 | 42% |
| Heat transmission Wt/(m * S) | 0.14 | 0.14 | 0 |

The data presented above show that the addition of fibers according to the invention to cellular concrete leads to improvement in its durability, while the heat transmission of test sample does not differ from that of the reference sample.

While the present invention has been illustrated and described with respect to a particular embodiment thereof, it should be appreciated by those of ordinary skill in the art that various modifications to this invention may be made without departing from the spirit and scope of the present.

What is claimed is:

1. A synthetic fiber for three-dimensional reinforcement of a cement product characterized in that is represents a coaxial core-coat fiber wherein the core comprises a thermoplastic polymer and one or more substance(s) initiating formation of fibrillar crystals in an amount of 0.5 to 3% of total weight of the core and/or one or more high-molecular polymer(s) and/or copolymer(s) in an amount of 3 to 30% of total weight of the core, and the coat comprises either
   a) a thermoplastic polymer resistant to environment having pH>11 and one or more hydrophilic and/or surface active substance(s) in an amount of 3 to 30% of the total weight of the coat, or
   b) a thermoplastic polymer resistant to environment having pH>11 grafted with active or unsaturated monomers of one or different kinds constituting 3 to 25% of the total weight of the coat,
   wherein the surface tension of the coat is at least 45 mN/m, and
   wherein the substance initiating formation of fibrillar crystals in the core represents one or more finely dispersed minerals selected from oxide, nitride, carbide and silicate, and has a mean particle size which is 10 to 50 times smaller than the cross-sectional area of the fiber, and the high-molecular polymer(s) and/or copolymer(s) is selected form polyvinyl alcohol and ethylene vinylacetate having vinylacetate content of not more than 15 wt. %.

2. The fiber of claim 1 wherein its coat consists of thermoplastic polymer resistant to environment having pH>11 grafted with active or unsaturated monomers of one or different kinds constituting 3 to 25% of total weight of the coat.

3. The fiber of claim 1 wherein the active or unsaturated monomers are selected from the group consisting of isobutylene, alpha-methylstyrene, vinylalkyl ethers, isoprene, butylacrylate, methylacrylate, methylmethacrylate, butylacrylate, butylmethacrylate, butadiene and styrene.

4. The fiber of claim 1 wherein the hydrophilic substance represents hydrophilic polymer or copolymer.

5. The fiber of claim 4 wherein the hydrophilic polymer is selected from the group consisting of polyglycol ester, polyethoxylated amide, ethylene vinylacetate with vinylacetate content of at least 30 wt. %, ethylene-acrylic acid copolymer, polyethylene-glycol lauryl ether, alkyl-phosphate-amine ester and ethylene-diamine polyethyleneglycol.

6. The fiber of claim 1 wherein the hydrophilic substance represents fatty acid ester or fatty acid amide.

7. The fiber of claim 6 wherein the fatty acid ester represents stearic acid glycerol ester.

8. The fiber of claim 6 wherein the fatty acid amide represents stearic acid amide.

9. The fiber of claim 1 wherein the surface active substance represents non-ionic surface active substance or cationic surface active substance.

10. The fiber of claim 1 wherein the thermoplastic core polymer is selected from the group consisting of isotactic polypropylene, polyethylene, poly-4-methyl-1-pentene and polyethylene terephthalate.

11. The fiber of claim 1 wherein the thermoplastic coat polymer in either or both of a) or b) is selected from the group consisting of isotactic polypropylene, polyethylene and poly-4-methyl-1-pentene.

12. The fiber of claim 1 wherein its diameter is 10 to 50 μm.

13. The fiber of claim 12 wherein its diameter is 18 to 25 μm.

14. The fiber of claim 1 wherein its cut length is 3 to 25 mm.

15. The fiber of claim 1 wherein the core/coat weight ratio is 50/50 to 90/10.

16. The fiber of claim 15 wherein the core/coat weight ratio is 85/15 to 90/10.

17. A method of production of the fiber according to claim 1 comprising the extrusion of melt of the coat polymer and of the core polymer through a coaxial spinneret to form a biocomponent composition wherein one or more hydrophilic and/or surface active substance(s) in an amount of 3 to 30% of total weight of the coat and one or more substance(s) initiating fibrillar crystal formation in an amount of 0.5 to 3% of total weight of the core and/or one or more high-molecular polymer(s) and/or copolymer(s) in an amount of 3 to 30% of total weight of the core are introduced into the coat polymer melt during the extrusion, wherein the substance initiating fibrillar crystal formation in the core represents one or more finely dispersed minerals selected from oxide, nitride, carbide and silicate, and has a mean particle size which is 10 to 50 times smaller than the cross-sectional area of the fiber, and the high-molecular polymer(s) and/or copolymer(s) is selected form polyvinyl alcohol and ethylene vinylacetate having vinylacetate content of not more than 15 wt. %.

18. The method of claim 17 wherein the resulting fiber is stretched with the stretch ratio of 2.5 to 4.5.

19. The method of claim 17 which further comprises treating the surface of the fiber with corona discharge and/or with hydrophilic and/or surface active substance selected from the group consisting of fatty acid-glycidol esters, fatty acid amides, polyglycol esters, polyethoxylated amides, non-ionic surface active substances and cationic surface active substances, or with mixture of two or more said substances.

20. A method of production of the fiber according to claim 1 comprising the extrusion of melt of the coat polymer and of the core polymer through a coaxial spinneret to form a biocomponent composition wherein the coat polymer comprises a thermoplastic polymer grafted with active and/or unsaturated monomers constituting 3 to 25% of total weight of the coat, and wherein one or more substance(s) initiating fibrillar crystal formation in an amount of 0.5 to 3% of total weight of the core and/or one or more high-molecular polymer(s) and/or copolymer(s) in an amount of 3 to 30% of total weight of the core are introduced into the coat polymer melt during the extrusion, wherein the substance initiating fibrillar crystal formation in the core represents one or more finely dispersed minerals selected from oxide, nitride, carbide and silicate, and has a mean particle size which is 10 to 50 times smaller than the cross-sectional area of the fiber, and the high-molecular polymer(s) and/or copolymer(s) is selected form polyvinyl alcohol and ethylene vinylacetate having vinylacetate content of not more than 15 wt. %.

21. The method of claim 20 wherein the resulting fiber is stretched with the stretch ratio of 2.5 to 4.5.

22. The method of claim 20 which further comprises treating the surface of the fiber with corona discharge and/or hydrophilic and/or with surface active substance selected from the group consisting of fatty acid-glycidol esters, fatty acid amides, polyglycol esters, polyethoxylated amides, non-ionic surface active substances and cationic surface active substances, or with mixture of two or more said substances.

23. A cement product prepared from a member selected from concrete mix, mortar mix, and cement paste, said member comprising a dispersion of synthetic fibers wherein the synthetic fibers represent the fibers of claim 1.

24. The cement product of claim 23 wherein it comprises the synthetic fiber in an amount 0.01 to 0.05% by weight of the cement material.

25. A method of production of cement product comprising preparing aqueous concrete mix, aqueous cement mortar or aqueous cement paste, adding synthetic fibers to said mix, mortar, or paste, stirring said mix or mortar or paste and casting it to obtain an article, characterized in that the synthetic fibers represent the fibers of claim 1.

26. The method of claim 25 wherein said fibers have length of at least 3 mm and less than 8 mm.

27. The method of claim 25 wherein said fibers have length of 8 to 25 mm.

28. The method of claim 25 wherein said concrete mix or cement paste additionally comprise plasticizing agent which represent organic surface active hydrophilic or hydrophobic additive.

29. The fiber of claim 1 wherein the coat either:
a) comprises a thermoplastic polymer resistant to environment having pH>11 and one or more hydrophilic and/or surface active substance(s) wherein the hydrophilic substance(s) is selected from the group consisting of polyglycol ester, polyethoxylated amide, ethylene vinylacetate with vinylacetate content of at least 30 wt. %, polyethylene-glycol lauryl ether, alkyl-phosphate-amine ester, ethylene-diamine polyethyleneglycol, fatty acid ester and fatty acid amide, and the surface active substance(s) are nonionic surface active substance(s) and/or cationic surface active substance(s), in an amount of 3 to 30% of the total weight of the coat, or
b) consisting essentially of a thermoplastic polymer resistant to environment having pH>11 grafted with active or unsaturated monomers of one or different kinds constituting 3 to 25% of the total weight of the coat.

30. The fiber of claim 1 wherein the core thermoplastic polymer and the coat thermoplastic polymer each comprises isotactic polypropylene.

31. The fiber of claim 10 wherein the thermoplastic coat polymer is isotactic polypropylene.

* * * * *